US010751972B2

(12) United States Patent
Brown

(10) Patent No.: US 10,751,972 B2
(45) Date of Patent: Aug. 25, 2020

(54) GROUND COVERING FOR OUTDOOR APPLICATION

(71) Applicant: COMBITILE PTY LTD., Long Jetty, New South Wales (AU)

(72) Inventor: Graham Kevin Brown, Long Jetty (AU)

(73) Assignee: COMBITILE PTY. LTD., New South Wales (AU)

(*) Notice: Subject to any disclaimer, the term of this patent is extended or adjusted under 35 U.S.C. 154(b) by 0 days.

(21) Appl. No.: 16/343,128

(22) PCT Filed: Oct. 20, 2017

(86) PCT No.: PCT/AU2017/051141
§ 371 (c)(1),
(2) Date: Apr. 18, 2019

(87) PCT Pub. No.: WO2018/071981
PCT Pub. Date: Apr. 26, 2018

(65) Prior Publication Data
US 2019/0291382 A1 Sep. 26, 2019

(30) Foreign Application Priority Data
Oct. 20, 2016 (AU) .................................. 2016904266

(51) Int. Cl.
*B32B 3/30* (2006.01)
*E01C 5/00* (2006.01)
(Continued)

(52) U.S. Cl.
CPC ................ *B32B 3/30* (2013.01); *B32B 3/266* (2013.01); *B32B 7/08* (2013.01); *E01C 5/005* (2013.01);
(Continued)

(58) Field of Classification Search
CPC . B32B 3/30; B32B 2250/242; B32B 2250/02; B32B 3/266; B32B 27/32;
(Continued)

(56) References Cited

U.S. PATENT DOCUMENTS 5,383,314 A * 1/1995 Rothberg ................ E02D 31/02
405/43
5,950,378 A * 9/1999 Council ................ E01C 13/045
52/177

(Continued)

FOREIGN PATENT DOCUMENTS

KR 100642330 B1 10/2006
WO 2003033818 A1 4/2003
(Continued)

OTHER PUBLICATIONS

International Search Report issued in connection with PCT/AU2017/051141, dated Nov. 28, 2017, 3 pages.

*Primary Examiner* — Brent W Herring
(74) *Attorney, Agent, or Firm* — Duane Morris LLP

(57) ABSTRACT

A ground covering comprising:
a base panel including a sheet with an array of protrusions extending therefrom;
a top panel including an array of receptacles for mating with at least a number of said protrusions;
one or more drainage conduits formed through each of the protrusions, each drainage conduit being at least partially occluded by a baffle; and
complementary engagement formations on peripheries of the protrusions and of the receptacles for fastening the top panel to the base panel.

14 Claims, 7 Drawing Sheets

(51) Int. Cl.
*E01C 11/22* (2006.01)
*E01C 13/04* (2006.01)
*B32B 3/26* (2006.01)
*B32B 7/08* (2019.01)

(52) U.S. Cl.
CPC .......... *E01C 11/225* (2013.01); *E01C 13/045* (2013.01); *E01C 2201/16* (2013.01); *E01C 2201/205* (2013.01)

(58) Field of Classification Search
CPC ........... B32B 27/08; B32B 7/08; B32B 7/023; B32B 3/263; B32B 2307/4026; E01C 13/045; E01C 11/225; E01C 5/005; E01C 2201/205; E01C 2201/16
USPC ....... 52/169.1, 169.11, 169.14, 169.5, 403.1, 52/302.3
See application file for complete search history.

(56) References Cited

U.S. PATENT DOCUMENTS

| | | | |
|---|---|---|---|
| 6,851,133 B1 * | 2/2005 | Nehring | A47K 3/40 4/612 |
| 7,730,679 B2 * | 6/2010 | Eckenswiller | E06B 7/14 137/527.8 |
| 8,696,241 B2 * | 4/2014 | Lee | E01C 13/083 405/39 |
| 8,955,278 B1 * | 2/2015 | Mills | E04B 5/48 52/302.3 |
| 9,149,825 B1 * | 10/2015 | Blakeslee | A01M 7/0064 |
| 9,303,356 B2 * | 4/2016 | Manninen | B32B 38/0004 |
| 9,358,752 B2 * | 6/2016 | Manninen | B32B 7/08 |
| 9,587,351 B2 * | 3/2017 | Manninen | D21F 1/0036 |
| 9,593,450 B2 * | 3/2017 | Manninen | D21F 1/0036 |
| 9,616,638 B2 * | 4/2017 | Manninen | B32B 5/022 |
| 9,909,264 B1 * | 3/2018 | Stiles | F21S 8/022 |
| 9,909,266 B1 * | 3/2018 | Stiles | E01C 5/20 |
| 2004/0076474 A1 * | 4/2004 | Parker | E02D 31/02 405/49 |
| 2011/0097151 A1 * | 4/2011 | Lee | E01C 13/083 405/39 |
| 2012/0036630 A1 * | 2/2012 | Cook | E03F 5/0408 4/679 |
| 2014/0259380 A1 * | 9/2014 | Eilmus | E03C 1/22 4/650 |
| 2015/0132524 A1 * | 5/2015 | Manninen | B32B 7/08 428/43 |
| 2015/0267348 A1 * | 9/2015 | Manninen | B32B 38/0004 428/596 |
| 2016/0039171 A1 * | 2/2016 | Manninen | B32B 5/022 428/114 |
| 2016/0053498 A1 * | 2/2016 | Brown | E04F 15/225 52/403.1 |
| 2018/0044861 A1 * | 2/2018 | Stiles | F21S 8/022 |
| 2018/0148937 A1 * | 5/2018 | Brown | E04F 15/225 |
| 2019/0119862 A1 * | 4/2019 | Penland, Jr. | E04F 15/105 |

FOREIGN PATENT DOCUMENTS

| | | |
|---|---|---|
| WO | 2009095026 A1 | 8/2009 |
| WO | 2011133006 A2 | 10/2011 |
| WO | WO-2014169328 A1 * | 10/2014 |

* cited by examiner

GROUND COVERING FOR OUTDOOR APPLICATION

CROSS REFERENCE TO RELATED APPLICATIONS

This application is a National Stage Application, filed under 35 U.S.C. 371, of International Patent Application No. PCT/AU2017/051141, filed on Oct. 20, 2017, which claims priority to Australian Patent Application No. 2016904266 filed on Oct. 20, 2016, contents of both of which are incorporated herein by reference in their entireties.

TECHNICAL FIELD

The present invention relates to a ground covering for use in outdoor areas. Particular embodiments of the present invention are suited for use in recreational areas such as playgrounds for children.

BACKGROUND

Any references to methods, apparatus or documents of the prior art are not to be taken as constituting any evidence or admission that they formed, or form part of the common general knowledge.

It is known to use a synthetic ground covering for outdoor areas such as playing fields and playgrounds for children. One type of ground covering that is sometimes used is synthetic grass, which is basically a carpet that has an upper layer of plastic tufts that resemble natural grass. Synthetic grass is less than ideal in some situations because it tends to become waterlogged and does not drain well. A further issue is that there are many situations where the appearance of a synthetic grass covering is inappropriate. For example, it would be desirable if the ground covering readily allowed for a selection of color schemes to be presented.

Other playground surfacing options include poured-in-place (PIP) EPDM (ethylene propylene diene monomer), coloured crushed car tyres and plastic or foam rubber tiles. However, PIP EPDM has poor resistance to chlorine so that it is not suited to being applied in areas where there is a cholorinated swimming pool. There are also problems such as mould, drainage, fading and volatile organic compounds (VOCs), which pose a health risk to people applying the product.

Plastic or foam rubber tiles may also be used but they too have a number of disadvantages such as:
  Require either welding of joints and/or gluing to the substrate
  May fade over time
  Difficult to patch or replace
  Limited color range
  No graphics
  Must be fine and dry during installation
  VOC's—unhealthy to applicators Another consideration is that where a ground covering is applied in a publicly accessible space, for example a playground, it is important that the covering should be inherently resilient to tampering and vandalism.

It is an object of the present invention to provide an outdoor ground covering that addresses one or more of the problems of the prior art or which is at least a useful commercial alternative to ground covering systems that have hitherto been available.

SUMMARY OF THE INVENTION

According to a first aspect of the present invention there is provided a ground covering comprising:

a base panel including a sheet with an array of protrusions extending therefrom;
  a top panel including an array of receptacles for mating with at least a number of said protrusions;
  one or more drainage conduits formed through each of the protrusions, each drainage conduit being at least partially occluded by a baffle; and
  complementary engagement formations on peripheries of the protrusions and of the receptacles for fastening the top panel to the base panel.

Preferably at least some of the baffles assist in preventing material beneath the base panel from protruding through the drainage conduits in use.

It is preferred that the protrusions each comprise a plate with a skirt thereabout. For example, the plate may be a circular disk or alternatively, it may be rectangular, square or some other non-regular shape.

In the preferred embodiment of the invention the sheet is formed with openings therethrough wherein each plate is located over one of the openings and held fast thereto by one or more support members extending from the sheet to the skirt.

In the preferred embodiment of the invention, the support members define locking recesses for receiving one of the complementary engagement formations. Preferably said one of the complementary engagement formations comprises a latching projection that is received by the locking recess.

The complementary engagement formations may each comprise a reversible snap-fit projection protruding inwardly from the periphery of the receptacle.

In a preferred embodiment of the present invention the top plate of each protrusion may be buttressed. For example an underside of the plate may be formed with one or more cross braces or reinforcing walls for strengthening the plate.

In a further aspect of the invention there is provided a method of assembling a ground covering with drainage including the steps of:
laying a plurality of base panels to cover the ground, each base panel including a sheet with an array of protrusions extending therefrom and one or more drainage conduits formed through each of the protrusions, each drainage conduit being at least partially occluded by a baffle;
overlaying a plurality of top panels on the plurality of base panels, each top panel including an array of receptacles for mating with at least a number of the protrusions;
applying force to the top panels so that complementary engagement formations on peripheries of the protrusions and of the receptacles fasten the top panels to the base panels.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
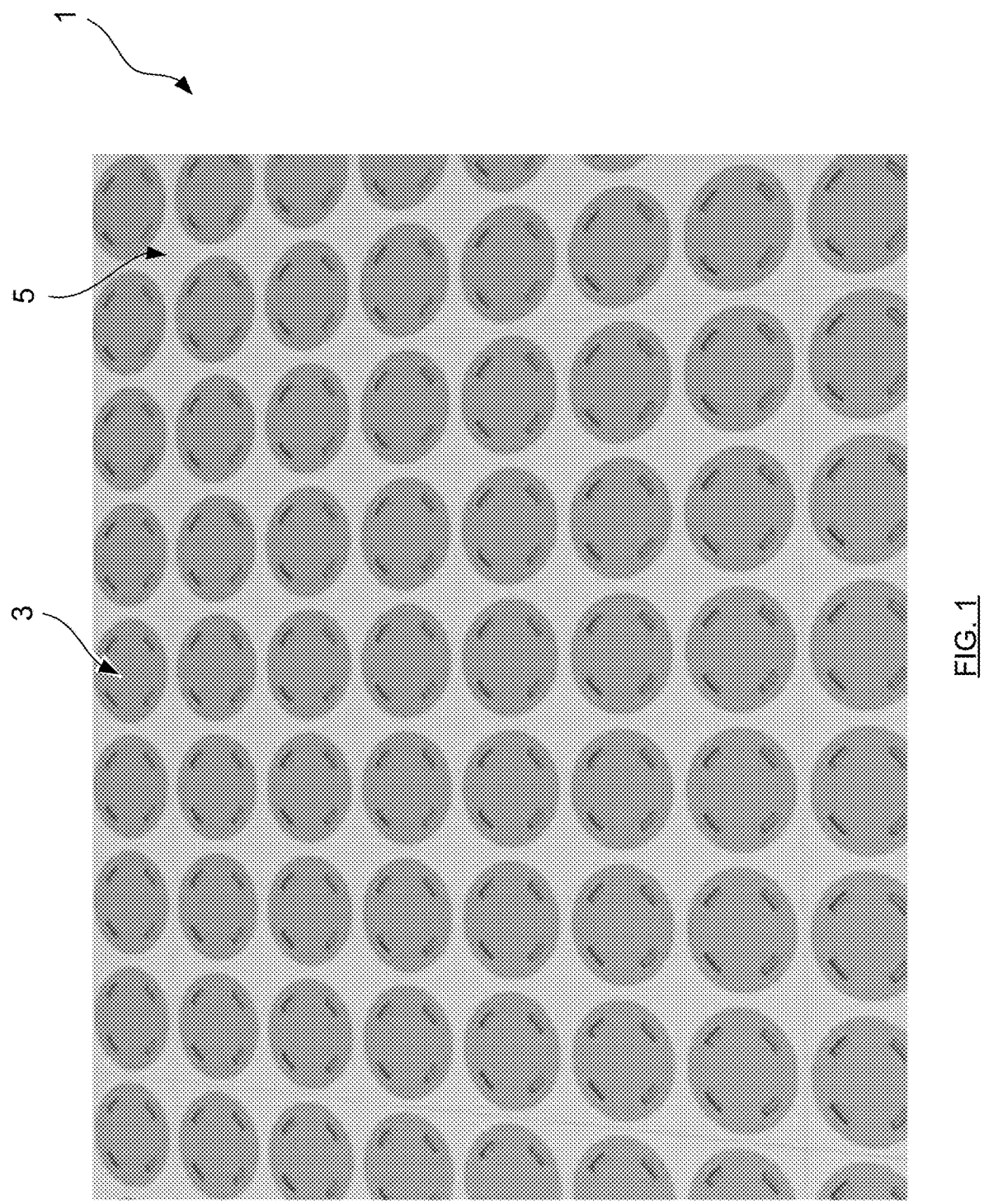
FIG. 1 is a slightly off-normal view of the upper surface of a ground covering according to a preferred embodiment of the present invention.

FIG. 1 is a view of the top of a portion of a ground covering 1 according to a preferred embodiment of the present invention. The ground covering 1 is made of a base panel 3 and a top panel 5 which are fastened together, as will be described. The base panel 3 in conjunction with the top panel 5 present the flat upper surface that is shown in FIG. 1, for foot traffic. The base panel 3 and the top panel 5 are preferably made from a moulded, resilient, synthetic material. For example, a preferred material is polypropylene. Other members of the polyolefin group of materials may also be used or another synthetic material that has similar properties.

Figure 2:
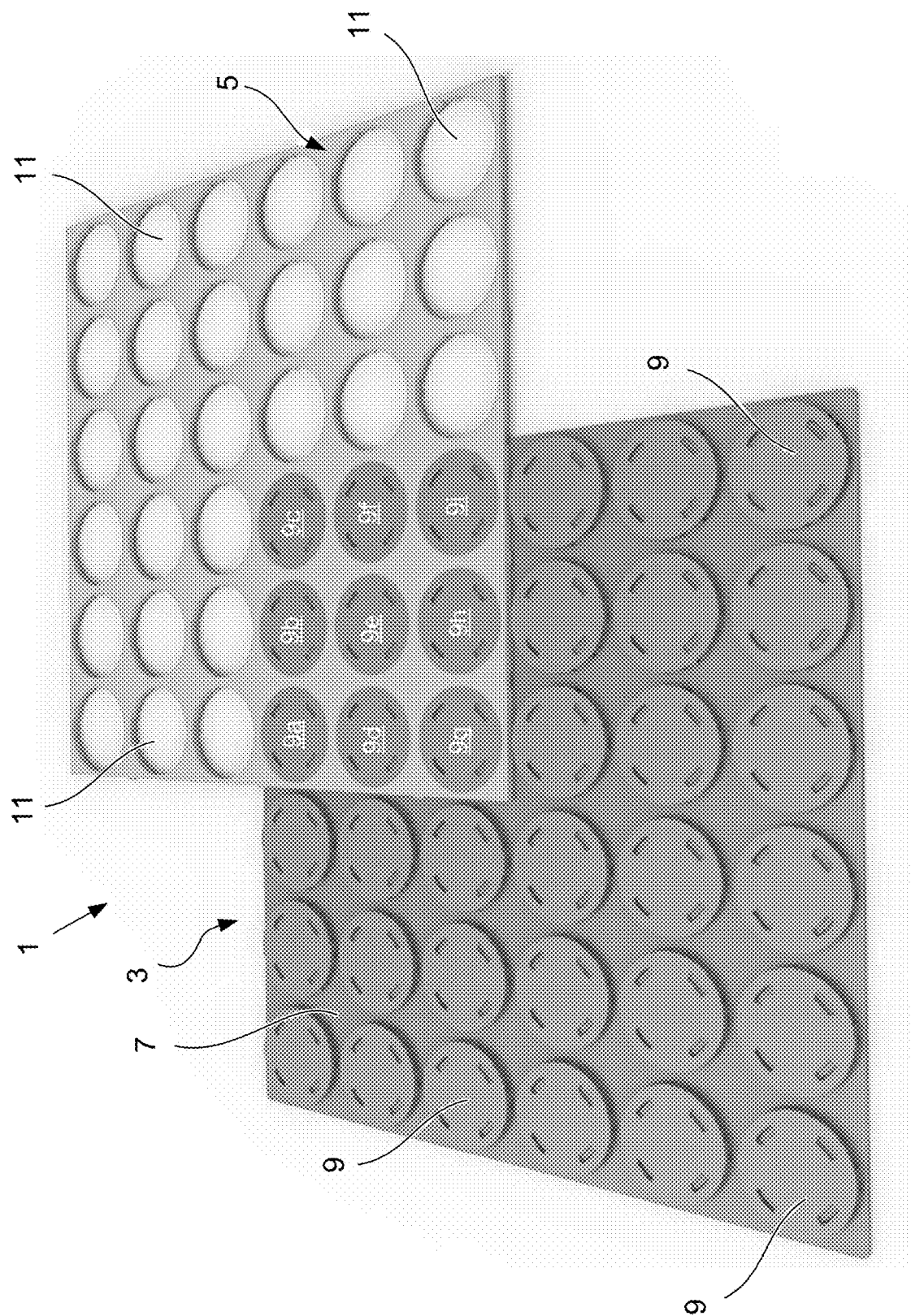
FIG. 2 is a view of the two-part ground covering of FIG. 1 with base panel and top panel components offset from each other.
Figure 3:
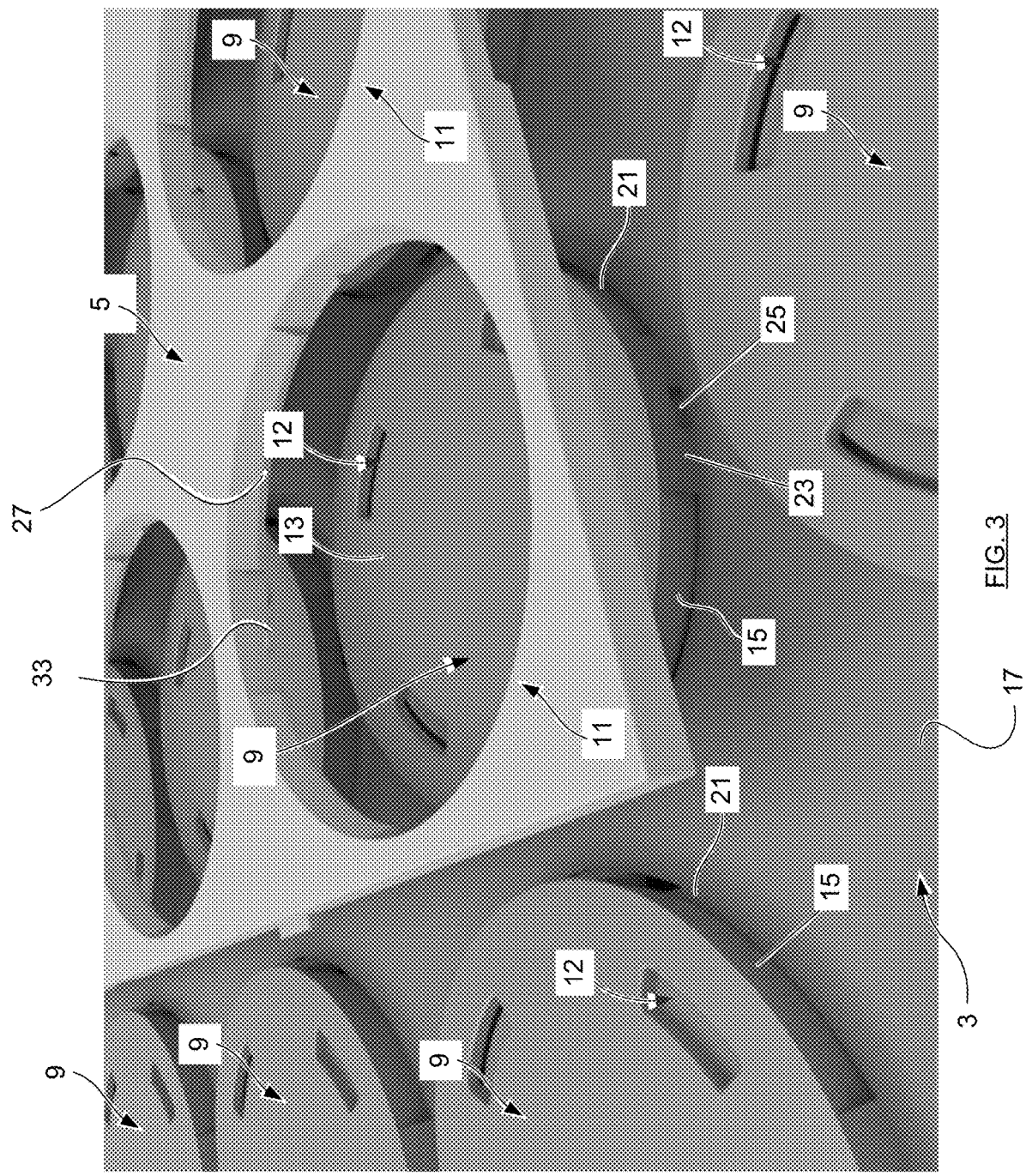
FIG. 3 is a detailed view of a portion of a top panel and a base panel of the ground covering in a disengaged state.

FIG. 2 shows the base panel 3 offset from the top panel 5 so that the structure of each can be more readily discerned. FIG. 3 is a detail view of a corner of the top panel 5 located slightly above the base panel 3, prior to its installation thereon.

Figure 7:
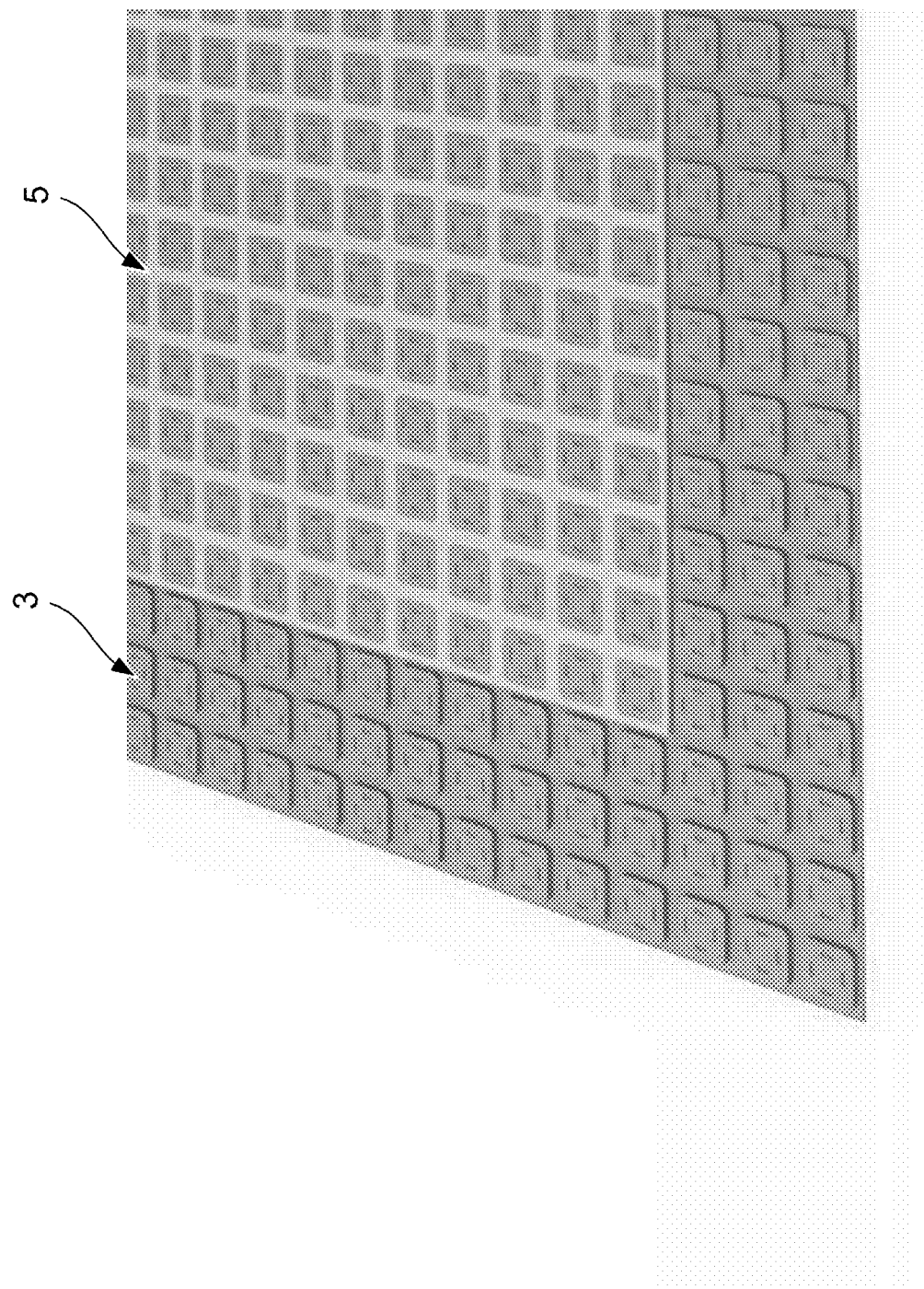
FIG. 7 is a view of the upper side of a portion of a two part covering according to a further embodiment of the present invention.

It will be observed that the base panel 3 comprises a sheet 7 with an array of protrusions 9 extending therefrom. In the presently described embodiment the protrusions 9 are each disk shaped. However, as will be discussed, other shapes are also possible in other embodiments of the invention. For example FIG. 7 shows a further embodiment in which the protrusions are each of a square shape.

Figure 4:
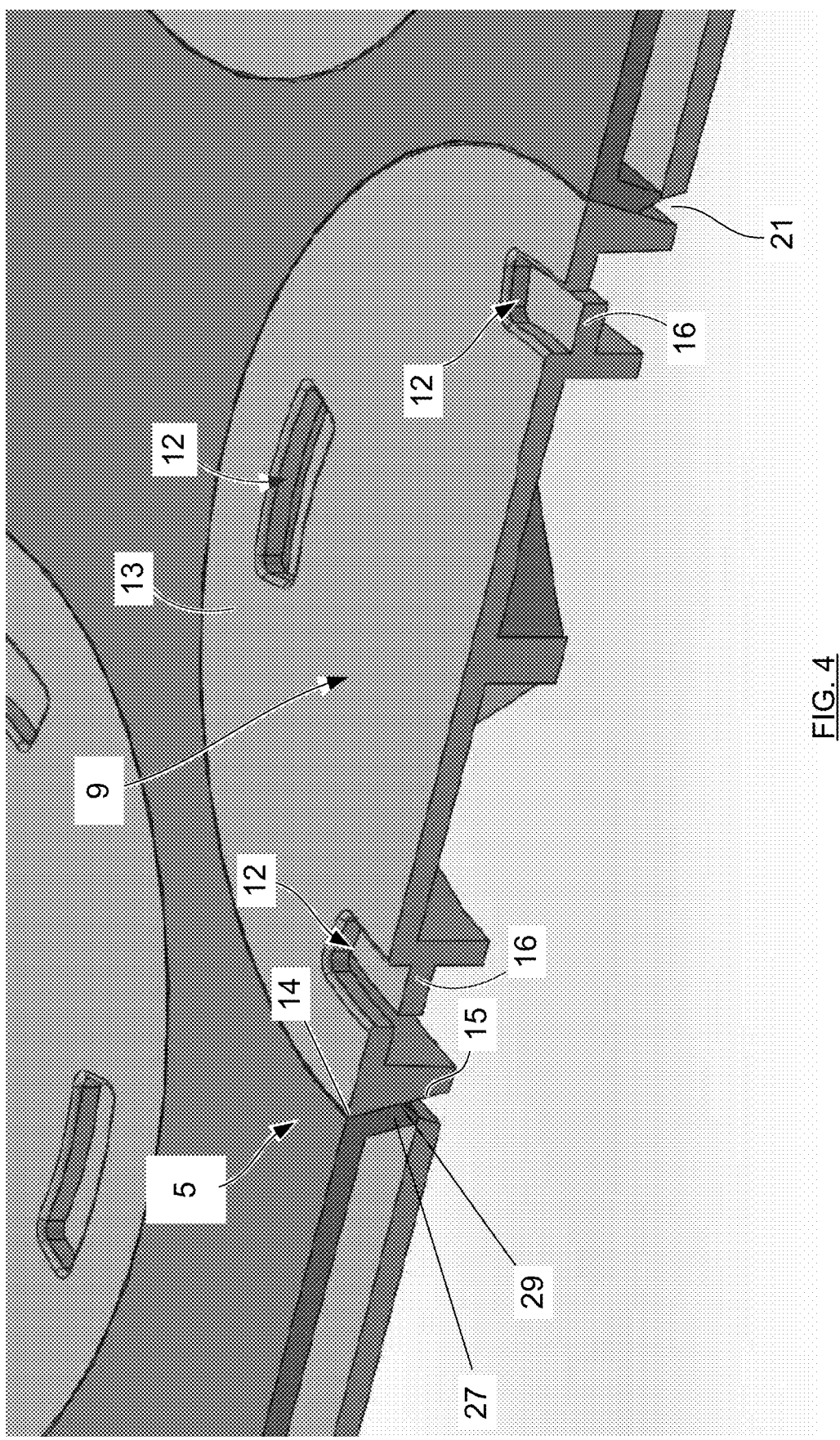
FIG. 4 is a first cross sectional view through a portion of the two-part covering of FIG. 1.

Referring again to FIG. 2, each of the protrusions 9 includes one or more drainage conduits 12 which are formed through a top plate 13 of each protrusion. As best seen in FIG. 4, the drainage conduits 12 are each stepped due to them each being partially occluded by a baffle 16 which assists in preventing material beneath the base panel from protruding through the drainage conduits 12 in use.

The top panel 5 is formed with an array of receptacles 11, which in the present instance are circular holes that complement the disk shaped protrusions 9 and which are arranged to mate with the protrusions. In the example shown in FIG. 2 nine of the receptacles 11 are shown mated with corresponding protrusions 9a, . . . , 9i of the base panel.

Referring now to FIG. 3, it is preferred that the protrusions 9 each comprise a plate 13 with a skirt 15 thereabout. For example, the plate 13 may be a circular disk, as shown in FIG. 3, or alternatively, it may be rectangular, square or alternatively another, non-regular shape. A further embodiment of the invention wherein the protrusions are square in shape is shown in FIG. 7. The skirt is slightly undercut in that it converges inwardly and downwardly from a top edge 14 (shown in FIG. 4).

The base panel 3 comprises a sheet 17 that is formed with a plurality of openings 21 therethrough. Each plate 13 is located over one of the openings 21 and is held fast in place by one or more support members 23 which extend from the sheet 17, at the periphery of the opening 21, to the skirt 15. By holding the plate 13 away from the base plate by means of the support members 23, a degree of suspension is imparted to the plate by virtue of the support members being able to momentarily deform in response to a shock being applied to the plate.

As best seen in FIG. 3, each of the protrusions 9 and each of the receptacles 11 bear complementary engagement formations about their peripheries for fastening the top panel to the base panel. A locking opening 25 is formed through the support members 23 for receiving a latching projection 33 from the periphery of the receptacle 11.

In the presently described preferred embodiment of the invention the complementary engagement formations include four reversible snap fit projections 27 which have angled faces that extend from the periphery of the receptacle 11 inwardly to an apex 29. Consequently, forcing the receptacle 11 of the top panel 5 down over the protrusion 9 causes some momentary mutual deformation of the protrusion 9 and the receptacle 11 sufficient for the apex 29 to pass over the top edge 14 of the skirt 15. Once the apex 29 has passed over the top edge 14 of the skirt it is captured against the skirt 15 which has an undercut profile.

In addition to the four snap fit reversible projections 27 there are also four snap fit latching projections 33 located around the periphery of the receptacle 11.

Upon forcing the top panel 5 down so that the receptacles 11 engage about the protrusions 9 the latching projections 33 locate within the locking openings 25.

Figure 5:
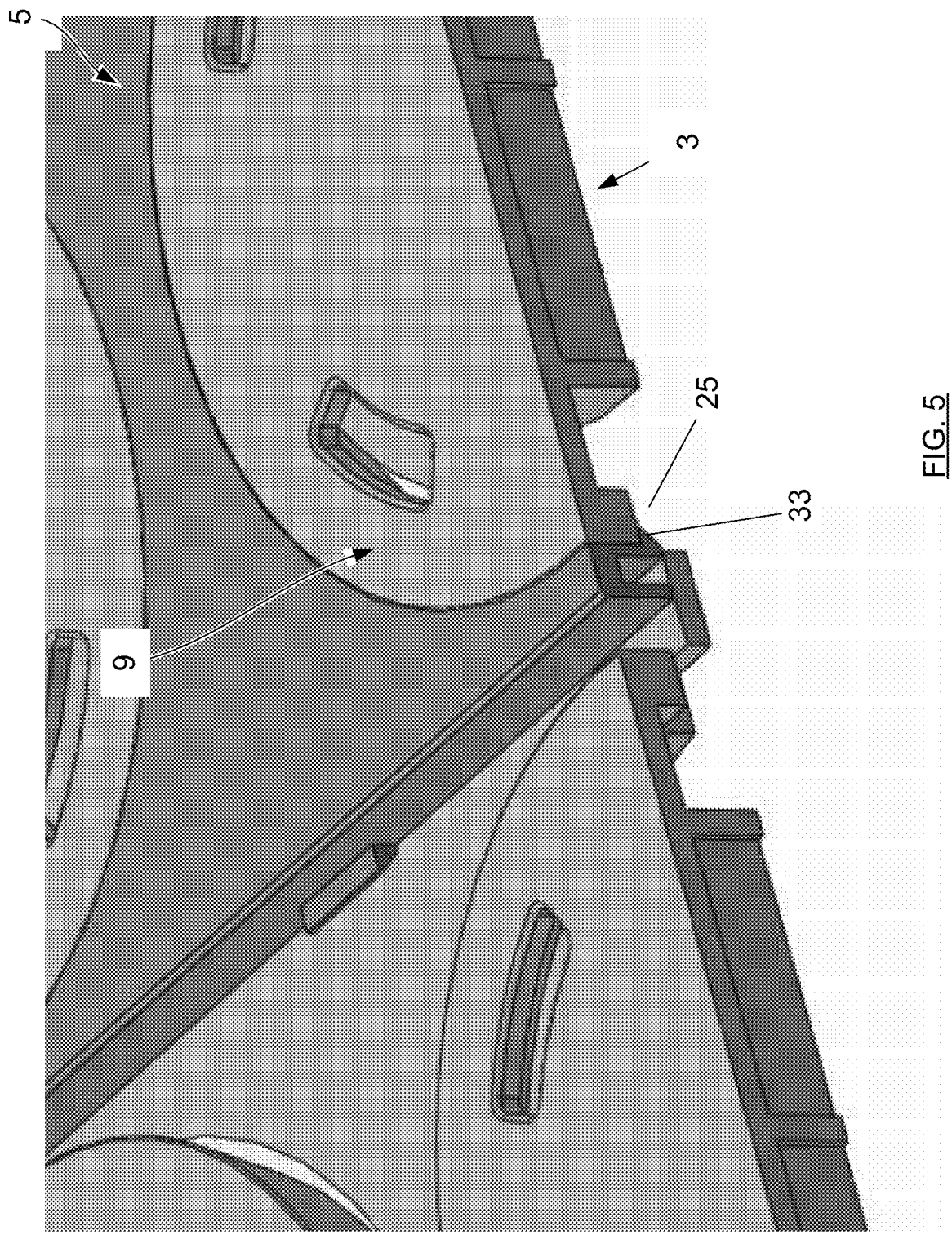
FIG. 5 is a second cross sectional view through a portion of the two-part covering of FIG. 1.

FIG. 5 is a cross section through the top panel and the base panel in which one of the latching projections 33 can be seen located within locking recess 25. Since the upper surface of the latching projection 33 is horizontal, applying a lifting force to the top panel 5 will not cause the latching projection 33 to disengage from the locking recess 25. Accordingly, the locking action of the latching projection 33 with the locking recess 25 is non-reversible unless a suitable tool is used to push the latching projection 33 laterally clear of the locking recess 25. Consequently, the ground covering is resilient to tampering and vandalism.

Figure 6:
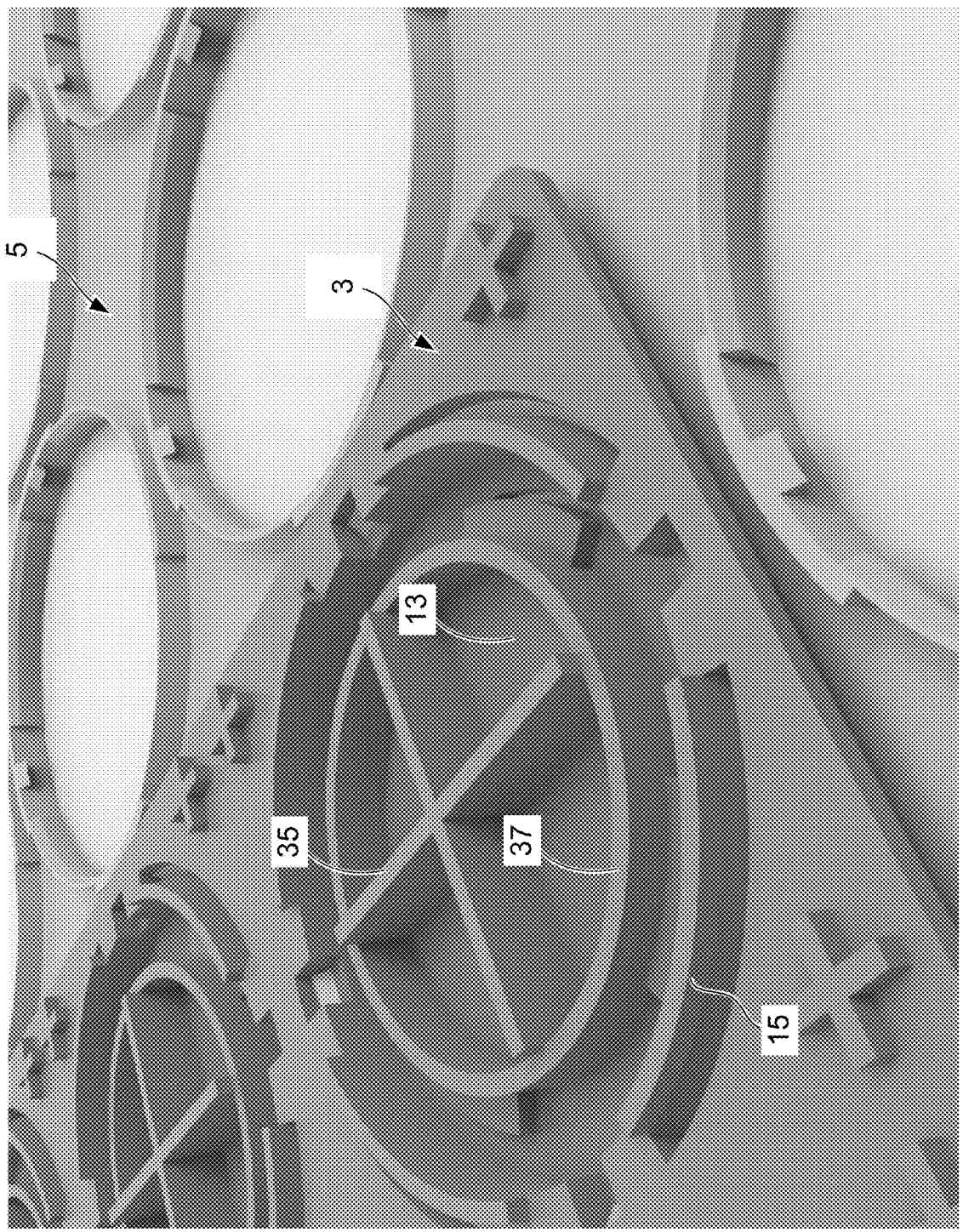
FIG. 6 is a view of the underside of the two part covering of FIG. 1.

FIG. 6 shows the undersides of the base panel and the top panel. The underside of the top plate of the protrusions are buttressed by cross braces 35 and reinforcing walls 37 for strengthening the plate 17.

In use one or more base panels 3 are laid out contiguously over ground to be covered. Top panels 5 are then installed so that they span adjacent bottom panels 3. Installation of the top panels typically involves the application of sufficient force to cause the engagement formations about the peripheries of the protrusions and the receptacles to engage. For example, mallets or heavy rollers may be used to apply force. The base 3 and top panels 5 may be manufactured out of different colored synthetic materials and the different colors may be selected to suit the color scheme of the area in which the ground covering is to be installed. For example, in a playground the color scheme for the swings, slides and other play items may be red and yellow. In that case the upper panel of the ground covering may be red whereas the lower panel is yellow. A selection of variously coloured panels may be provided so that they may be combined as desired to suit different settings.

Should it rain then the conduits through the protrusions assist in draining water from the upper traffic surface of the ground covering and thereby preventing pooling of water and the attendant danger posed by a slippery surface.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

The invention claimed is:

1. A ground covering comprising:
a base panel including a sheet and an array of protrusions extending from the sheet;
a top panel including an array of receptacles for mating with at least a number of said protrusions;
one or more drainage conduits formed through each of the protrusions, each drainage conduit being at least partially occluded by a baffle; and
complementary engagement formations on peripheries of the protrusions and of the receptacles for fastening the top panel to the base panel;
wherein each protrusion comprises a plate with a skirt thereabout and the sheet is formed with openings therethrough; and
wherein each plate is located over one of the openings and held fast by one or more support members extending from the sheet to the skirt.

2. A ground covering according to claim 1 wherein the baffles assist to prevent material beneath the base panel from protruding through the drainage conduits in use.

3. A ground covering according to claim 1 wherein the protrusions each comprise a plate with a skirt thereabout.

4. A ground covering according to claim 1 wherein the one or more drainage conduits are formed through the plate.

5. A ground covering according to claim 1 wherein the support members define locking recesses for receiving one of the complementary engagement formations.

6. A ground covering according to claim 5 wherein said one of the complementary engagement formations comprises a latching projection that is received by the locking recess.

7. A ground covering according to claim 1 wherein the complementary engagement formations include reversible snap-fit projections protruding inwardly from the periphery of the receptacle.

8. A ground covering according to claim 1 wherein the plate of each protrusion is buttressed.

9. A ground covering according to claim 8 wherein the buttressing comprises cross braces.

10. A ground covering according to claim 8 wherein the buttressing comprises reinforcing walls.

11. A ground covering according to claim 1 wherein the skirt converges inwardly and downwardly from the plate.

12. A ground covering according to claim 1 wherein the support members are resiliently deformable.

13. A ground covering according to claim 1 wherein the top panel and base panel are different colors.

14. A method of assembling a ground covering with drainage including the steps of:
laying a plurality of base panels to cover the ground, each base panel including a sheet and an array of protrusions extending from the sheet and one or more drainage conduits formed through each of the protrusions, each drainage conduit being at least partially occluded by a baffle;
overlaying a plurality of top panels on the plurality of base panels, each top panel including an array of receptacles for mating with at least a number of the protrusions;
applying force to the top panels so that complementary engagement formations on peripheries of the protrusions and of the receptacles fasten the top panels to the base panels.

* * * * *